United States Patent Office 2,937,526
Patented May 24, 1960

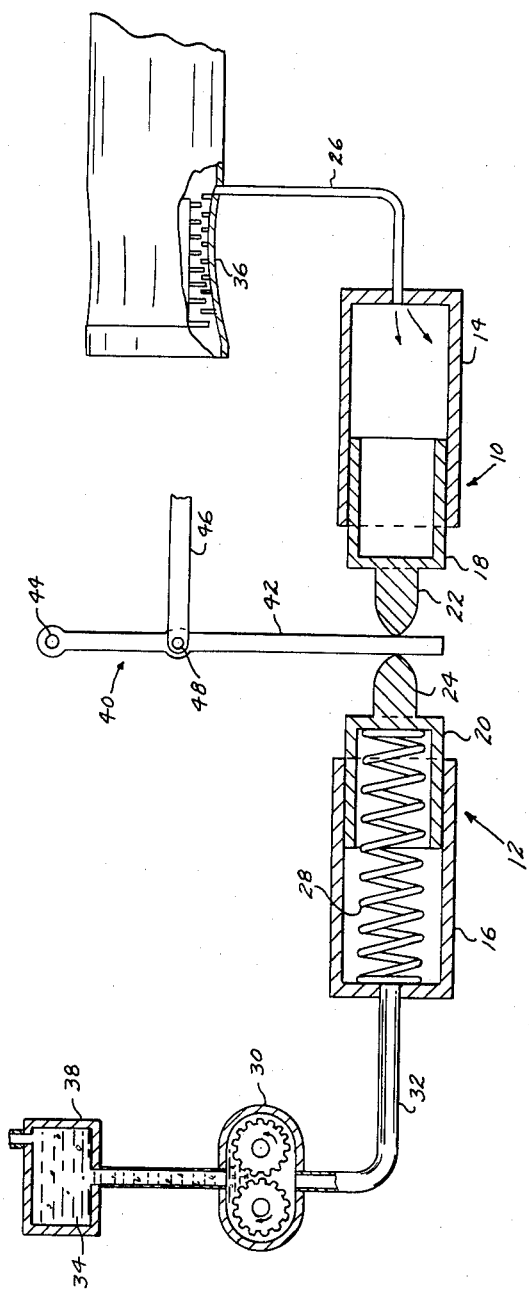

2,937,526

PRESSURE RESPONSIVE APPARATUS FOR TURBOJET ENGINE CONTROLS

Jean A. Roché, Reading, Ohio, assignor to the United States of America as represented by the Secretary of the Air Force Filed Sept. 12, 1956, Ser. No. 609,512

1 Claim. (Cl. 73—389)

This invention relates to a pressure responsive apparatus, and more particularly, to a pressure responsive apparatus of the type employed for absolute pressure measurements in turbojet engine controls.

Generally, the two most common jet engine control parameters, the compressor inlet pressure and the compressor outlet or discharge pressure, are used for determining the mass-flow of engine air and must be measured as absolute pressure.

Heretofore, in all engine controls, absolute pressure has been measured by the use of two bellows of equal effective area, one of which is evacuated and the other is subjected to the pressure which is desired to be measured. The force exerted by the bellows are then measured through direct action upon a spring or fuel pressure, etc.

The use of the bellows for measuring absolute pressure has several important disadvantages. First, the bellows are difficult to produce and are a major source of jet engine control failures. They are subject to "surging" vibration and fatigue failures. They permit only limited travel since stresses in the material must be kept low. Exact control of effective bellows area is hard to achieve. When the contained pressure is high they become impractically large and bulky. There is never any satisfactory assurance of reliability since flexibility calls for thin material and strength calls for thick sections. The spring constant of bellows is variable and cannot be closely controlled. They must be protected from rough handling and over pressure to preserve their characteristics. Also, the possibility of loss of vacuum through leakage is always present.

The main purpose of the present invention is, therefore, to provide a pressure responsive apparatus in which the above-mentioned deficiencies of bellows are overcome.

It is further the purpose of the present invention to provide an apparatus with improved pressure response for use in an engine control system and which measures either or both the inlet and the outlet or discharge pressures of the compressor as absolute pressures.

The pressure responsive apparatus constructed in accordance with the present invention is further characterized by its simple construction, its low cost of manufacture, and by being extremely reliable in operation.

A pressure responsive apparatus for turbojet engine controls, constructed in accordance with the present invention, comprises opposed force-exerting fluid motors responsive to fluid pressure in the engine, and force-relating means operatively associated with said fluid motors and arranged to transmit the force applied thereon for absolute pressure measurement.

These and other features of the present invention are described in detail below in connection with the accompanying drawing wherein like numerals designate like parts, and in which;

The single figure is a schematic illustration of a pressure responsive apparatus embodying the present invention.

The pressure responsive control apparatus illustrated in the drawing as an embodiment of the present invention comprises a pair of opposed force-exerting fluid motors 10 and 12 each of which consists of an open end cylinder 14 or 16 provided with a tubular piston 18 or 20 for slidable movement therein. Each of the pistons 18 and 20 is further joined with a rounded front end extension 22 or 24 for a purpose as hereinafter described. The piston 18 is subject to fluid pressure applied to its inner surface, which determines its position. This pressure is supplied to the cylinder 14 by a conduit 26 connected, for purpose of illustration, to the outlet section of an engine compressor 36 as shown in the drawing. However, the pressure supplied to the cylinder 14 may be from the inlet of the engine compressor 36 rather than the outlet, or from the inlet and the outlet, depending on whether the compressor inlet pressure which is a measure of the air density at the altitude of flight or the compressor outlet pressure which is a measure of the rate of flow of combustion air to the engine or the compressor pressure differential is desired. These factors are considered in determining, for example, such engine parameters as the fuel flow to the engine, the torque output of the engine, etc.

On the other hand, the fluid motor 12 is partially evacuated of pressure, and the piston 20 is biased outwardly by a spring 28 fitted in the tubular portion of the piston 20 and in the cylinder 16. The pressure in the cylinder 16 is partially evacuated by a vacuum producing pump 30 connected to the cylinder 16 by a conduit 32. The pump 30 is further arranged to be lubricated by a lubricant 34 supplied to the pump 30 through a conduit from a reservoir 38. By this arrangement, the pump losses are kept to a minimum.

The two fluid motors 10 and 12 are further arranged to operate an output signal lever mechanism 40 in response to the balance or unblance between the measuring fluid pressure in the cylinder 14 and the force of the spring 28. The lever mechanism 40 consists of a rod 42 freely suspended on a fixed pivot 44 and arranged to be engaged at its lower end by the rounded front ends of the piston extensions 22 and 24. The force exerted on the rod 42 by the compressor pressure through the piston 18 will cause the rod 42 to swing laterally either to the left or to the right depending on the magnitude of the force with respect to the force exerted through the piston 20. The movement of the rod 42 is thus transmitted by an arm 46 pivoted on the rod 42, as at 48, to some engine control system, not shown, wherein the compressor absolute pressure may be measured.

The present invention has been described in detail above for purposes of illustration only and is not intended to be limited by this description or otherwise except as defined in the appended claim.

I claim:

A pressure sensing apparatus for turbojet engine control comprising a first, partially evacuated force-exerting fluid motor having a first cylinder with an open end portion and a first tubular piston slidably positioned in overlapping relation within said open end portion and having a first rounded front end extension projecting outwardly thereof, a second force-exerting, opposed fluid motor having a second cylinder with an open end portion identical to that of said first cylinder and a second tubular piston slidably positioned in overlapping relation within said last-named open end portion and having a second rounded front end extension identical to and projecting outwardly in close proximity to said first front end extension in opposed relation thereto, first interconnecting conduit means between a point on the cylinder on said second fluid motor remote from said second piston front end extension and an engine compressor applying pressure to the inside of said second piston in accordance with the absolute pressure within the compressor tending to move said second piston in a predetermined direction, second interconnecting conduit means for maintaining the cylinder of said first fluid motor at a partial vacuum, said second interconnecting means comprising an interconnecting conduit in communication with said first cylinder at a point remote from said first piston front end portion and a vacuum pump interconnected with said interconnecting conduit, output signal means interconnected with said pair of opposed fluid motors comprising a relatively elongated lever mechanism freely suspended at one end on a fixed pivot and extending in transverse relation to the longitudinal axes of said pair of opposed fluid motors at its other end between and in contact on opposite sides thereof with the rounded front end extension members of said pair of opposed pistons, an arm pivotally mounted on said relatively elongated lever mechanism at an intermediate position adapted to transmit any movement of said lever mechanism to an engine control system, and resilient means disposed within the tubular portion of said first piston and first cylinder exerting a biasing force thereon outwardly in opposed relation to the force exerted on said second piston in accordance with the absolute pressure within the engine compressor to exert a differential force on the relatively elongated lever mechanism of said output signal means.

References Cited in the file of this patent
UNITED STATES PATENTS

| | | |
|---|---|---|
| 1,107,298 | Haas | Aug. 18, 1914 |
| 2,642,718 | Pearl | June 23, 1953 |
| 2,737,015 | Wright | Mar. 6, 1956 |
| 2,796,733 | Pearl et al. | June 25, 1957 |

FOREIGN PATENTS

| | | |
|---|---|---|
| 429,682 | Great Britain | June 4, 1935 |

OTHER REFERENCES

"New Absolute Manometer for Vapor Pressures in the Micron Range," The Review of Scientific Instruments, vol. 26, number 6, June 1955, pp. 584 to 589.